US008410904B2

(12) United States Patent
Liu et al.

(10) Patent No.: US 8,410,904 B2
(45) Date of Patent: Apr. 2, 2013

(54) WIRELESS REMOTE CONTROL LIGHTING UNIT AND WIRELESS REMOTE CONTROL LIGHTING SYSTEM AND CONTROL METHOD THEREOF

(75) Inventors: Jing-Meng Liu, Zhubei (TW); Shen Tu, Taipei (TW)

(73) Assignee: Richtek Technology Corporation, Hsin-Chu (TW)

( * ) Notice: Subject to any disclaimer, the term of this patent is extended or adjusted under 35 U.S.C. 154(b) by 249 days.

(21) Appl. No.: 13/072,710

(22) Filed: Mar. 27, 2011

(65) Prior Publication Data

US 2011/0248643 A1 Oct. 13, 2011

Related U.S. Application Data

(60) Provisional application No. 61/322,440, filed on Apr. 9, 2010.

(51) Int. Cl.
*H02J 13/00* (2006.01)

(52) U.S. Cl. ................................. 340/9.16; 340/825.52

(58) Field of Classification Search ................. 340/9.16, 340/825.52, 825.72; 315/291
See application file for complete search history.

(56) References Cited

U.S. PATENT DOCUMENTS

| | | | | |
|---|---|---|---|---|
| 7,446,671 | B2 * | 11/2008 | Giannopoulos et al. | 340/12.24 |
| 2004/0240395 | A1 * | 12/2004 | Gauthier et al. | 370/254 |
| 2006/0049935 | A1 * | 3/2006 | Giannopoulos et al. | 340/533 |
| 2011/0241848 | A1 * | 10/2011 | Van Herk | 340/12.5 |
| 2012/0306378 | A1 * | 12/2012 | Oh et al. | 315/151 |

* cited by examiner

*Primary Examiner* — Don Le
(74) *Attorney, Agent, or Firm* — Tung & Associates

(57) ABSTRACT

The present invention discloses a wireless remote control lighting unit and a wireless remote control lighting system and a control method thereof. The wireless remote control lighting unit comprises a power on detection circuit, which detects and counts the power on times of a power source during a predetermined period. When the power on times reach a threshold number, the wireless remote control lighting unit enters an address setting mode to set its address.

14 Claims, 5 Drawing Sheets

WIRELESS REMOTE CONTROL LIGHTING UNIT AND WIRELESS REMOTE CONTROL LIGHTING SYSTEM AND CONTROL METHOD THEREOF

CROSS-REFERENCE

The present invention claims priority to U.S. provisional application No. 61/322,440, filed on Apr. 9, 2010.

BACKGROUND OF THE INVENTION

1. Field of Invention

The present invention relates to a wireless remote control lighting unit, a wireless remote control lighting system and a control method thereof, in particular to such wireless remote control lighting unit, wireless remote control lighting system and control method that do not require a complicated handshaking process for addressing.

2. Description of Related Art

FIG. 1 explains the operation for wireless control of lighting units. Lighting units 10A, 10B, and 10C have different addresses; for example, the address of the lighting unit 10A is AAA, that of the lighting unit 10B is BBB, and that of the lighting unit 10C is CCC. Through radio frequency (RF), infrared (IR), or other carriers, signals containing addresses, instructions and so on are transmitted and received between a remote controller 11 and the lighting units 10A, 10B, and 10C, as the arrows of dash lines shown in this figure. The instructions transmitted by the remote controller 11 may be to turn on or turn off a lighting unit, to increase or decrease its brightness (dimming) and so on. In FIG. 1, as an example, the remote controller 11 transmits a signal AAAXXX, and it means that an instruction XXX is sent to the lighting unit 10A with the address AAA. After the address and instruction are transmitted by the remote controller 11, each of the lighting units 10A, 10B, and 10C receives the same information of the address and the instruction and checks whether the received address matches its address. If it is affirmative, the lighting unit (10A) will execute the instruction XXX; if it is negative, the corresponding lighting unit (10B, 10C) will ignore the instruction XXX.

In view of the above, each of the lighting units 10A, 10B, and 10C must have an address. This creates an issue as to how an address can be assigned to a lighting unit. One way to set an address to a lighting unit is to do so when the lighting unit is being manufactured. However, this requires a global address management system, and the remote controller 11 needs to be set again every time when a user replaces any lighting unit with a new one, which is obviously quite inconvenient. If the address is not set for the lighting unit when it is in manufacture, the lighting unit must have both transmitter and receiver circuits for bidirectional handshaking with the remote controller 11 to establish a link, and the remote controller 11 also must have both transmitter and receiver circuits for the handshaking process; this increases the hardware cost.

FIG. 2A shows an example of a prior art action flowchart which requires a bidirectional handshaking process to establish a link, wherein the address is set to the lighting unit after the light unit is installed. As shown in the figure, after power on, the lighting unit and the remote controller 11 enter an address setting mode to set the address of the lighting unit. After the lighting unit is set with an address, it enters an action mode to receive and execute the instructions transmitted by the remote controller 11, as shown in FIG. 1.

The disadvantages of the foregoing prior art are: First, in the address setting process, it requires complicated handshaking steps between the lighting unit and the remote controller 11 to check and avoid the used addresses, assign an unused address to an unaddressed lighting unit, check acknowledgement from the lighting unit, . . . , etc.; the process is very complicated. Second, the lighting unit and the remote controller 11 must be equipped with both receiver circuits and transmitter circuits, so the hardware cost is increased. In addition, such system always first enters the address setting mode when power on, so the action time is delayed. Furthermore, if the address is stored in a non-volatile memory instead of a volatile memory, the repeated address settings consume the write endurance and reduce the lifetime of the non-volatile memory.

FIG. 2B shows another prior art action flowchart. After power on, a lighting unit always first enters the action mode, and it enters the address setting mode only when it receives a specific code or certain verified information, which indicates that an unaddressed lighting unit has been installed or some other events that require renewing the address or repairing the address link with the remote controller 11. However, this approach still requires similar complicated handshaking steps, and both the lighting unit and the remote controller 11 need to be equipped with transmitter and receiver circuits, requiring a higher cost in terms of the number and specification of the circuit devices.

U.S. Patent Publication No. 2006/0049935 discloses a method for wireless control of a lighting unit. In this patent, it is the lighting unit that transmits its address and it is the remote controller that receives the address to construct the address link. However, this still does not overcome the above drawbacks: the requirement of bi-directional transceivers in both the lighting unit and the remote controller and the complicated handshaking steps for address setting.

In view of the above, the present invention proposes a wireless remote control lighting unit, a wireless remote control lighting system and a control method to overcome the foregoing drawbacks.

SUMMARY OF THE INVENTION

A first objective of the present invention is to provide a wireless remote control lighting unit.

A second objective of the present invention is to provide a wireless remote control lighting system.

A third objective of the present invention is to provide a control method for a wireless remote control lighting system.

To achieve the foregoing objectives, in one aspect, the present invention provides a wireless remote control lighting unit which receives power from a power source, the wireless remote control lighting unit comprising: a lighting unit; a power circuit coupled to the lighting unit; a driver circuit driving the power circuit to supply current to the lighting unit for lighting; and a power on detection circuit detecting and counting power on times of the power source during a predetermined period, wherein when the power on times reach a threshold number, the wireless remote control lighting unit enters an address setting mode to set an address of the wireless remote control lighting unit.

In another aspect, the present invention provides a wireless remote control lighting system, comprising: a remote controller transmitting a remote control signal, wherein the remote control signal contains an address signal; a wireless remote control lighting unit which receives power from a power source and receives the remote control signal, the wireless remote control lighting unit including a power on detection circuit which detects and counts power on times of the power source during a predetermined period, wherein when the power on times reach a threshold number, the wireless remote control lighting unit enters an address setting mode to set an address of the wireless remote control lighting unit.

In order for the power on detection circuit to be active during a power off period, a capacitor coupled to the power on detection circuit is preferably provided to supply the power on detection circuit with required power.

In yet another aspect, the present invention provides a control method for a wireless remote control lighting unit, the wireless remote control lighting unit receiving power from a power source, the method comprising: detecting and counting power on times of the power source during a predetermined period; entering an address setting mode for setting an address of the wireless remote control lighting unit when the power on times reach a threshold number; receiving a remote control signal, wherein the remote control signal includes an address signal; and setting the address of the wireless remote control lighting unit according to the address signal.

In the wireless remote control lighting unit and the wireless remote control lighting system and the control method for a wireless remote control lighting system, the address signal is preferably compared with a current address of the wireless remote control lighting unit in the address setting mode. When the address signal is the same as the current address, the current address of the wireless remote control lighting unit is kept and not rewritten. When the address signal is not the same as the current address, the address of the wireless remote control lighting unit is renewed according to the address signal.

In the wireless remote control lighting unit and the wireless remote control lighting system and the control method for a wireless remote control lighting system, preferably, the address setting mode is stopped when address setting is not completed within an address setting period.

The objectives, technical details, features, and effects of the present invention will be better understood with regard to the detailed description of the embodiments below, with reference to the drawings.

DESCRIPTION OF THE PREFERRED EMBODIMENTS

Figure 3:
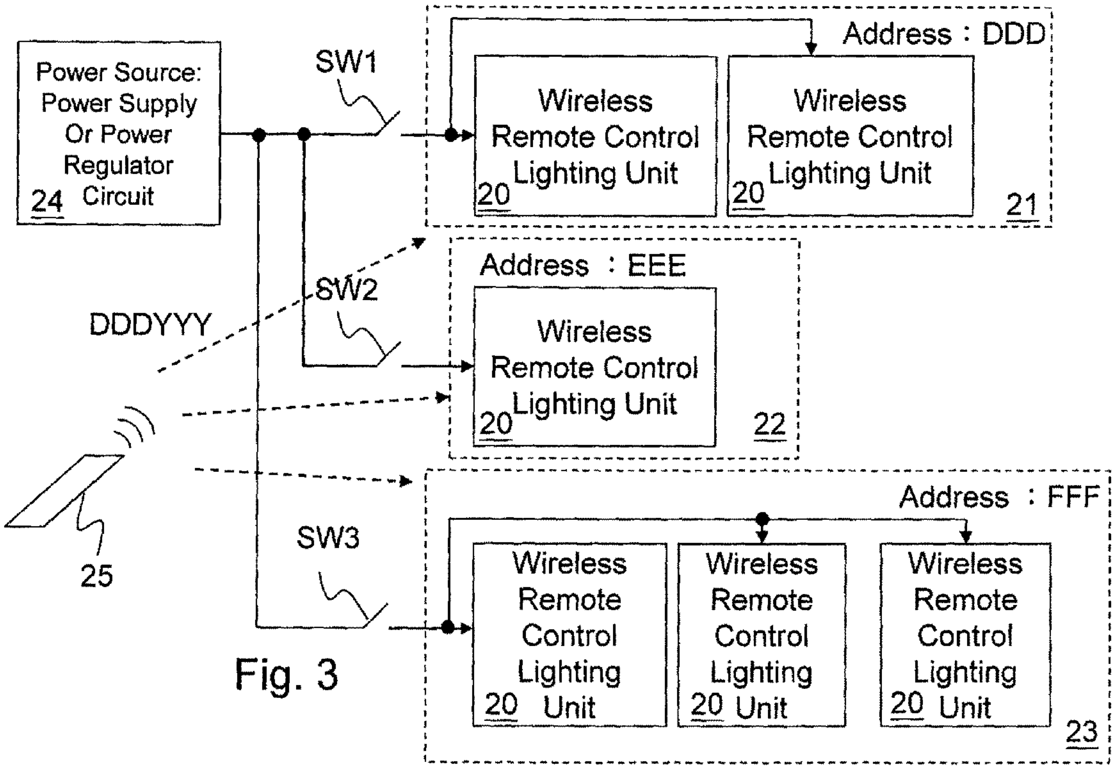
FIG. 3 shows an arrangement of lighting units according to the present invention.

FIG. 3 shows an arrangement of lighting units according to the present invention. Each of the lighting groups 21, 22, and 23 comprises at least one wireless remote control lighting unit 20. In this embodiment, all units of the same lighting group are coupled to the same switch; as shown in the figure, the lighting groups 21, 22, and 23 are respectively connected to switches SW1, SW2, and SW3. (However, as a variation, it can certainly be arranged in a way that each lighting unit 20 is individually connected to its own switch.) Every wireless remote control lighting unit 20 belonging to the same lighting group may have an identical address; e.g., the address of each lighting unit 20 of the lighting group 21 is DDD, the address of each lighting unit 20 of the lighting group 22 is EEE, and the address of each lighting unit 20 of the lighting group 23 is FFF. The remote controller 25 transmits remote signals to each of wireless remote control lighting unit 20 through, for example but not limited to, RF or IR, as the dash lines with arrows shown in this figure; the remote signals may contain addresses, instructions, etc. The instructions may be, for example but not limited to, turning on or off the lighting units of a lighting group, increasing or decreasing the brightness of the lighting units of a lighting group (dimming), setting the schedule of power on or off, and so on. In FIG. 3, as an example, the signal transmitted by the remote controller 25 is DDDYYY, which means that an instruction YYY is transmitted to the wireless remote control lighting unit with the address DDD. As the address and the instruction are being transmitted by the remote controller 25, each of the lighting units 20 receives this information and checks whether the transmitted address matches its own address. If yes, it proceeds to execute the instruction YYY; if not, it ignores the instruction YYY.

Figure 4:
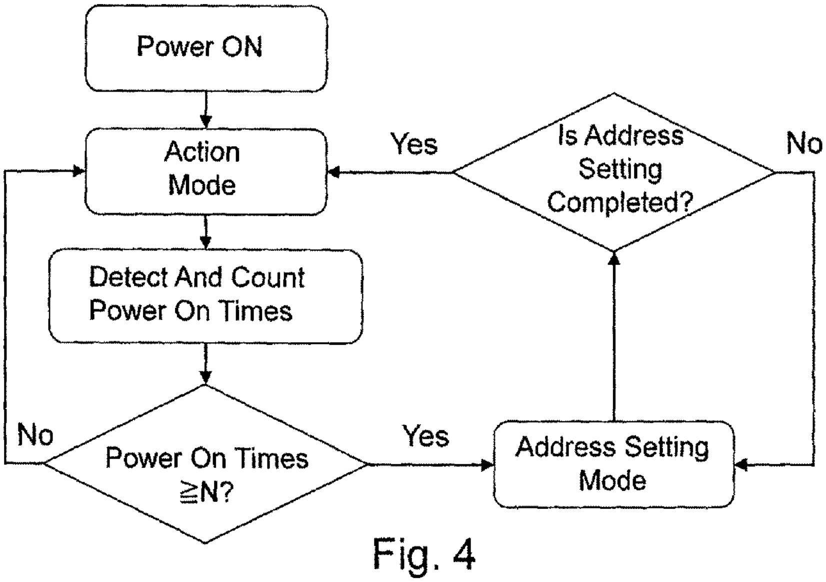
FIG. 4 shows an action flowchart of a wireless remote control lighting unit according to the present invention.

FIG. 4 shows the action flowchart of a wireless remote control lighting unit according to the present invention. The wireless remote control lighting unit first enters an action mode where it waits for, receives and executes instructions, and in the mean time it detects the power on times (i.e. the number of power-on events) during a predetermined period. When the power on times reach a threshold number N which is an integer larger than or equal to 1, the wireless remote control lighting unit enters an address setting mode; after the address setting is completed, the wireless remote control lighting unit returns to the action mode. The "power on times during the predetermined period" may be, for example but not limited to, one or a combination of two or more of the followings: counting total power on times of a power source during a preset period, counting power on times of the power source when an interval between two successive power on times meets a predetermined requirement, or counting power on times of the power source when an interval between two successive power off times meets a predetermined requirement. Following is an example to detect whether the power on times reach the threshold number: every time when the lighting unit is power on, the lighting unit measures an interval between the present power on and the last previous time point when the lighting unit is power on (i.e., the power off interval t(off) between two successive power on times), and checks whether the interval is smaller than a predetermined time period t0. If yes, add 1 to the count of power on times, and check whether the count reaches the threshold number N. If the count reaches the threshold number N, the lighting unit enters the address setting mode. (In a similar way, if the step of measuring the power off interval t(off) is replaced by measuring the total time period and having the count of power on times to be cumulative, it is "counting total power on times of a power source during a preset period"; if the step of measuring the power off interval t(off) is replaced by measuring the power on interval, it is "counting power on times of the power source when an interval between two successive power off times meets a predetermined requirement".)

When the wireless remote control lighting unit enters the address setting mode, a user can transmit a signal containing an address through the remote controller, and the wireless remote control lighting unit does the address setting according to the received signal; that is, only the lighting unit in the address setting mode is set with the transmitted address, while the other lighting units which have not detected N power on times are still in the action mode. That is, if a user would like to set the address of one group, the user only needs to turn on the lighting units of the group for N times within a short period and simultaneously transmits the address through the remote controller, and the address setting is done. The advantages are: first, it does not require complicated handshaking steps to construct the address link, and each light unit can clearly recognizes whether it needs to enter the address setting mode; second, the remote controller only needs to be equipped with the transmitter and the lighting unit only needs to be equipped with receiver, so the hardware cost is reduced.

Figure 5:
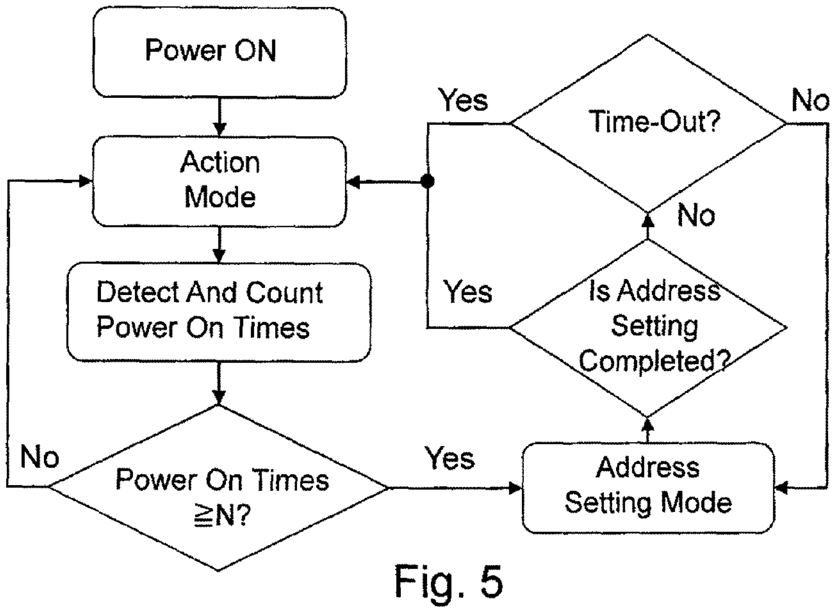
FIGS. 5-7 show other embodiments of the action flowcharts of a wireless remote control lighting unit according to the present invention.

FIG. 5 shows another embodiment, illustrating the action flowchart of a wireless remote control lighting unit according to the present invention. In this embodiment, when the wireless remote control lighting unit enters the address setting mode, and it can not complete the address setting during a address setting period (the "address setting period" is not the "predetermined period" for detecting the power on times), for example for the reason that it can not receive a valid address signal, it can leave the address setting mode and return to the action mode, such that this provides a time-out error-proof mechanism to prevent the system from staying in the address setting mode because of a mis-touch of the power switch by the user or other reasons. Such mechanism can be applied to either the case that the threshold number N is larger than 1 or the case that N is equal to 1, but if N=1, the system preferably follows the action flowchart as shown in FIG. 5, that is, after power on, the wireless remote control lighting unit searches for a valid address setting signal only within a limited address setting period, and it leaves the address setting mode and enters the action mode after time-out.

Referring to FIG. 3, when a wireless remote lighting unit 20 belonging to a lighting group is newly installed, the user needs to set its address. For example, if one of the two lighting units 20 of the lighting group 21 is replaced by a new lighting unit, the user transmits an address signal DDD by the remote controller 25 after the new lighting unit 20 is installed, and turns on the switch SW1 for N times within a short period so as to set the address of the wireless remote lighting unit 20 of the lighting group 21. For illustration purposes, the threshold number N is assumed to be 3; thus, after the third power on of the switch SW1, all of the lighting units 20 of the lighting group 21 enter the address setting mode, receiving the address DDD transmitted from the remote controller 25 through respective receivers, and setting their addresses as DDD. In the meanwhile, the lighting units 20 of the other lighting groups will not change their addresses because they do not detect three successive power on times (switch SW2 and switch SW3 are not turned on or turned off). Similarly, in the lighting group 22 and 23, the addresses of the lighting units 20 can be respectively set as EEE and FFF by the same address setting process.

Figure 1:
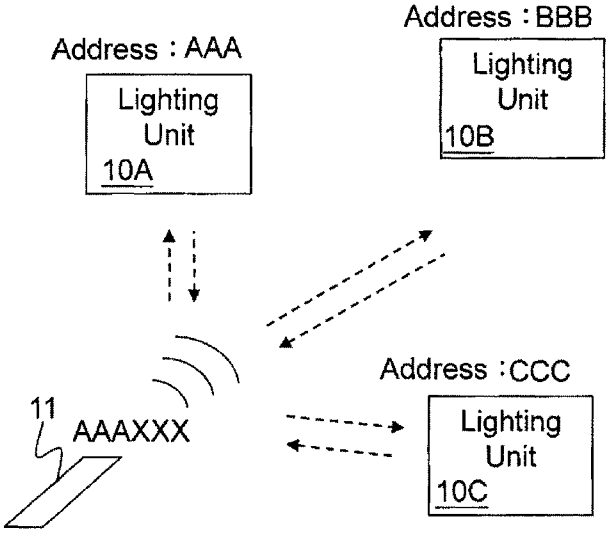
Fig. 1 (Prior Art)
FIG. 1 explains the operation for wireless control of lighting units.
Figure 2A:
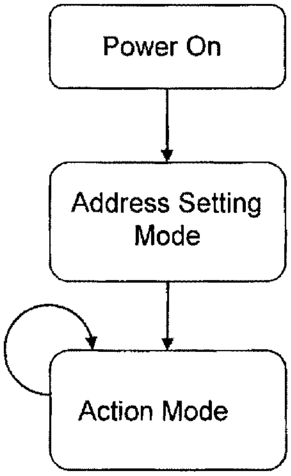
Fig. 2A (Prior Art)
FIG. 2A shows an example of a prior art action flowchart which requires a handshaking process to establish a link.
Figure 2B:
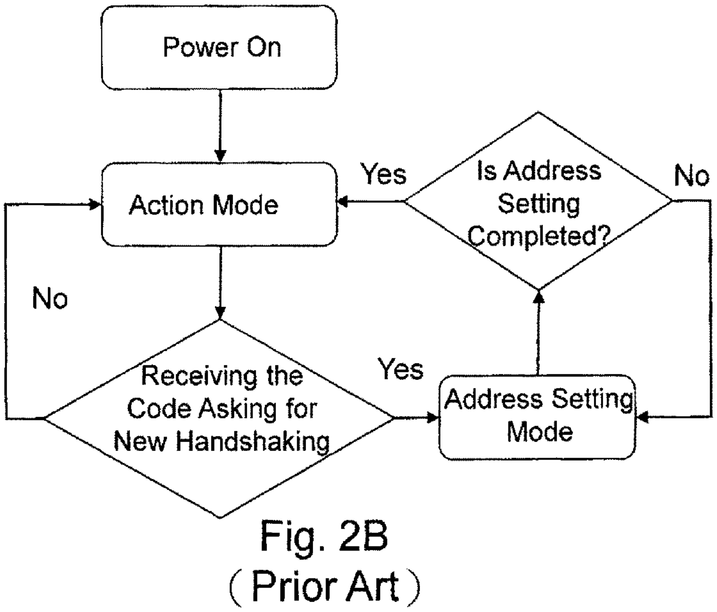
Fig. 2B (Prior Art)
FIG. 2B shows another prior art action flowchart.

In the foregoing example, when a new wireless remote control lighting unit 20 is installed in a lighting group, all the other lighting units in the same lighting group simultaneously renew their addresses. Such an operation could consume the memory lifetime in the wireless remote control lighting unit 20 which already has an address. (If the memory of the lighting unit 20 is a non-volatile memory or the like, such as EPROM (erasable programmable read-only memory), MTP (multi-time programmable memory) or other memory devices with limited write cycles, repeated address settings consumes the write endurance and reduces the lifetime of the memory.) However, such memory consumption is acceptable because it only occurs when a new wireless remote control lighting unit 20 is installed. By contrast, the prior art as shown in FIG. 2A needs renew the address every time the power is turned on.

Figure 6:
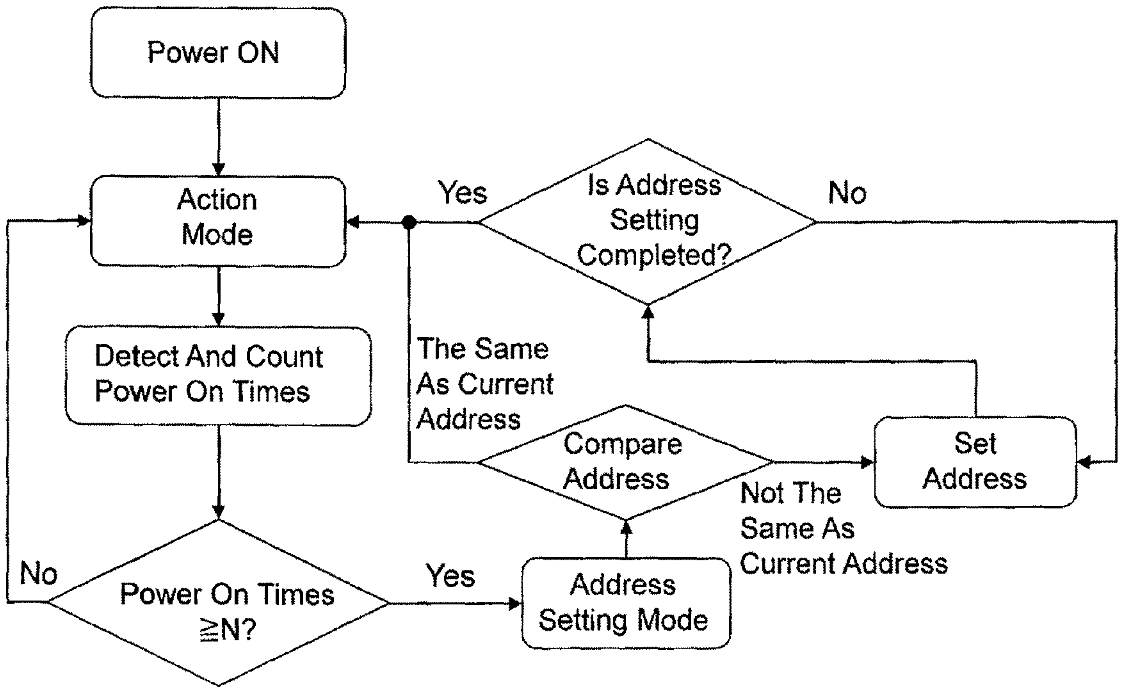

Nevertheless, the consumption of the write cycles of the memory can be further reduced according to the present invention. First, from a method point of view, as shown by the flowchart of FIG. 6, after the wireless remote control lighting unit 20 enters the address setting mode, the address signal transmitted by the remote controller 25 (referring to FIG. 3) is first compared with the current address of the wireless remote control lighting unit. If the address signal is the same as the current address, the address of the wireless remote control lighting unit 20 does not need to be renewed, and this lighting unit 20 directly enters the action mode. Only when the transmitted address signal is different from the current address, then the address of the wireless remote control lighting unit 20 is renewed according to the transmitted address signal. Thus, the required write operations can be reduced to alleviate the consumption of memory.

Figure 7:
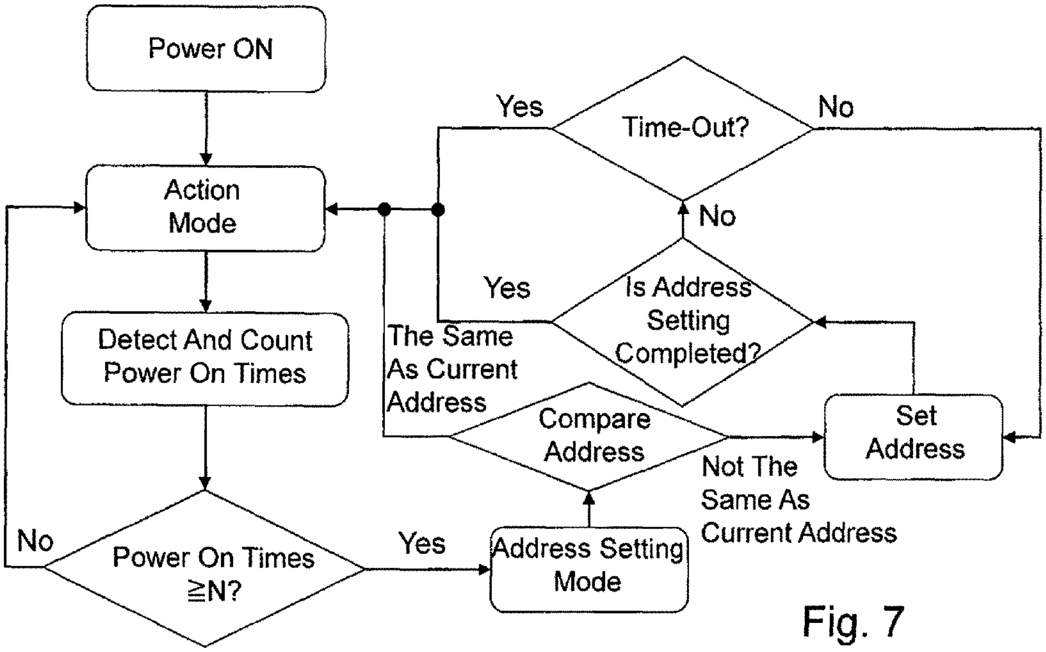

The time-out error-proof mechanism in FIG. 5 can also be applied to the foregoing embodiment, as shown in FIG. 7. When the wireless remote control lighting unit 20 enters the address setting mode, if the address setting can not be completed during an address setting period, the lighting unit leaves the address setting mode and enters the action mode.

The foregoing methods can be implemented by hardware in various ways; an embodiment thereof will be explained later with reference to FIG. 9.

Figure 8:
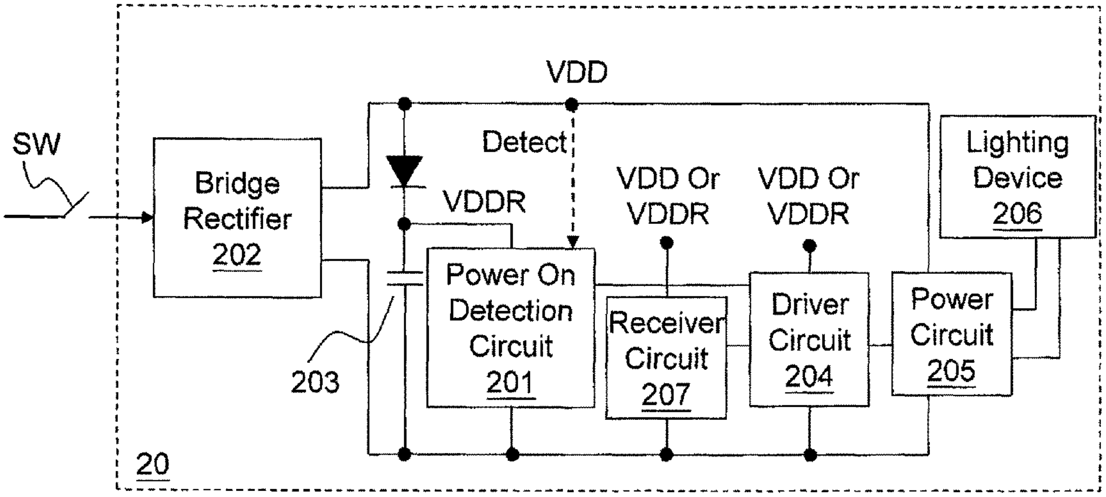
FIG. 8 is a hardware embodiment of the present invention, illustrating a configuration of the wireless remote controller 20.

FIG. 8 shows a hardware embodiment of the present invention, illustrating a configuration of the wireless remote lighting unit 20. As shown in this figure, the wireless remote control lighting unit 20 comprises a power on detection circuit 201, a bridge rectifier 202, a capacitor 203, a driver circuit 204, a power circuit 205, a lighting device 206, and a receiver circuit 207. In this embodiment, it is assumed that the power received through the switch SW is AC, and therefore the bridge rectifier 202 is provided. If the power is DC, the lighting unit 20 does not need the bridge rectifier 202. In normal operation, the AC power is converted to a DC voltage VDD through the bridge rectifier 202, and the voltage VDD is supplied to the driver circuit 204, the power circuit 205, and the receiver circuit 207 (alternatively, the receiver circuit 207 and the driver circuit 204 can receive power supplied by VDDR). The driver circuit 204 drivers the power circuit 205 and converts the voltage VDD to a regulated voltage or current which is supplied to the lighting unit 206 for lighting. The lighting unit 206 may be, for example but not limited to, an LED (light emitting diode) circuit. The receiver circuit 207 receives the remote signal transmitted by the remote controller 25 (referring to FIG. 3), and send a corresponding signal to the driver circuit 204. When the address contained in the remote signal matches the address of the lighting unit 20, the light unit 20 operates according to the instruction transmitted by the remote controller 25. Please note that the separated circuit blocks in this figure are drawn for easier understanding of the circuit functions; the circuits are not necessarily separated individual circuits. For example, the power on detection circuit 201 can be integrated with the receiver circuit 207; the driver circuit 204 can be integrated with the power circuit 205; the power on detection circuit 201 can be integrated with the receiver circuit 207 and the driver circuit 204; or the power on detection circuit 201 can be integrated with the receiver circuit 207, the driver circuit 204 and the power circuit 205. Even the bridge rectifier 202 can also be integrated with other circuits, although it may require a more complicated manufacturing process.

Figure 9:
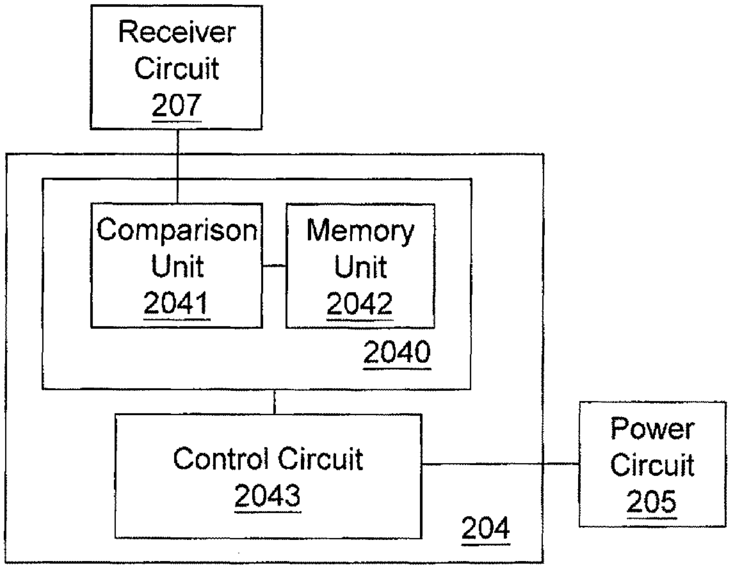
FIG. 9 shows an embodiment of the present invention, illustrating a block diagram of the driver circuit 204.

Referring to FIG. 9, in one embodiment, the driver circuit 204 comprises a processing circuit 2040 and a control circuit 2043, wherein the processing circuit 2040 includes a comparison unit 2041 and a memory unit 2042. The processing circuit 2040 receives the signal transmitted from the remote controller 25 (referring FIG. 3) through the receiver circuit 207, and the comparison unit 2041 compares the address contained in the signal and the current address (stored in the memory unit 2042) of the lighting unit to confirm whether they are the same as each other. If the comparison result is affirmative, the control circuit 2043 of the processing circuit 2040 executes an operation corresponding to the instruction in the signal. If the signal is an address setting instruction and the address of the signal is not the same as the current address of the lighting unit, the processing circuit 2040 writes the address in the signal to the memory unit 2042. If the signal is an address setting instruction and the address of the signal is the same as the current address of the lighting unit, the processing circuit 2040 does not rewrite the address to the memory unit 2042. In the processing circuit 2040, the comparison unit 2041 and the memory unit 2042 can be implemented by hardware, software, or firmware. What is described above is only one example among many possible arrangements; as a variation, the processing circuit 2040 does not need to be integrated into the driver circuit 204, but instead can be integrated into the receiver circuit 207 (if the processing circuit 2040 is integrated into the receiver circuit 207, the output signal of the power on detection circuit 201 of FIG. 8 is sent to the receiver circuit 207).

Referring back to FIG. 8, in the address setting mode, it is required for the wireless remote control lighting unit 20 to be able to temporarily store the count of the power on times during a power off period. Accordingly, the present invention provides the power on detection circuit 201 in the wireless remote control lighting unit 20 to detect and count the power on times during a predetermined period, and a capacitor 203 which is connected in parallel to the power on detection circuit 201, for supplying power VDDR to the power on detection circuit 201 such that the power on detection circuit 201 can count the power on times during the power off period in the predetermined period. As such, although the power is off in the predetermined period, the power on detection circuit 201 still can operate to count the power on times and the count can be accumulated. If the power off period is longer than the predetermined period such that the capacitor 203 discharges to a level too low that it can no longer supply enough power to the power on detection circuit 201, it means that the user does not intend to set the address, so the power on detection circuit 201 does not need to accumulate the count of the power on times. Furthermore, the discharging speed of the capacitor 203 can be a parameter to be controlled to execute the time-out error-proof mechanism (referring to the explanation of FIG. 5).

The count of the power on times can be stored in various ways, in the form of an analog or digital signal in a volatile or non-volatile device. For example, a sample-and-hold circuit can be provided to store the count of the power on times in the form of an analog signal, or, the count can be stored in the form of a digital signal in a digital memory circuit. When the accumulated power on times reach the threshold number N, the power on detection circuit 201 sends a signal to trigger the address setting mode.

The power on detection circuit 201 can be designed as an event-trigger type circuit which is normally in a standby mode, but becomes active when an action of the power switch is detected. Thus, the power consumption of the circuit can be reduced.

Figure 10:
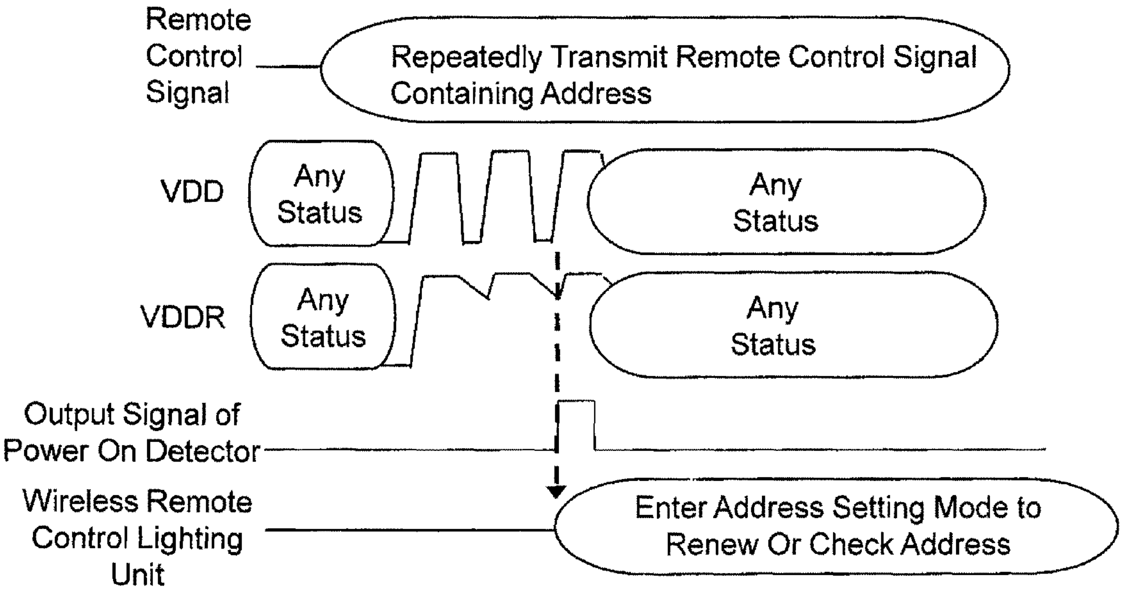
FIG. 10 is a signal waveform diagram illustrating the operation of entering an address setting mode.

Referring to FIG. 10 in conjunction with FIG. 8, in the address setting mode, the remote controller 25 (referring to FIG. 3) repeatedly transmits a remote signal containing the address signal. When the switch SW is turned off, the voltage VDDR of the capacitor 203 decreases only slightly within a short period from power off, and hence the power on detection circuit 201 still can detect and count the power on times. In this embodiment, if the threshold number N is 3, the power on detection circuit 201 sends a signal after the switch is turned on three times. The signal makes the wireless remote control lighting unit 20 enter the address setting mode, in which the lighting unit 20 renews its address according to the remote signal transmitted by the remote controller 25, or first confirms whether its current address is the same as the received address signal, and then renews its address when the current address is not the same as the received address signal. The output signal sent from the power on detection circuit 201 can be in any distinguishable signal form, including a pulse, a clock, a level, a bit-stream, . . . , etc.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the lighting device is not limited to an LED circuit, and it can be any device which needs address setting. The count of the power on times can be replaced by a count of the power off times, that is, the successive power off times when an interval between two successive power off times (a power on duration t(on) between two successive power off times) is small than a predetermined period t1. In more detail, besides counting total power on times of the power source during a preset period, counting power on times of the power source when an interval between two successive power on times meets a predetermined requirement, or counting power on times of the power source when an interval between two successive power off times meets a predetermined requirement, the present invention also can be embodied by counting total power off times of the power source during a preset period, counting power off times of the power source when an interval between two successive power on times meets a predetermined requirement, or counting power off times of the power source when an interval between two successive power off times meets a predetermined requirement. Moreover, in all of the foregoing embodiments, a device which does not affect the primary function of the circuit, such as switch or the like, can be interposed between two circuits or devices shown to be in direct connection. The processing circuit 2040 of the driver circuit 204 can be separated from the driver circuit 204 as an independent circuit or a single chip. Thus, the present invention should cover all such and other modifications and variations, which should be interpreted to fall within the scope of the following claims and their equivalents.

What is claimed is:

1. A wireless remote control lighting unit which receives power from a power source, the wireless remote control lighting unit comprising:

a lighting unit;

a power circuit coupled to the lighting unit;

a driver circuit controlling the power circuit to supply current or voltage to the lighting unit for lighting; and a power on detection circuit detecting and counting power on times of the power source during a predetermined period, wherein when the power on times reach a threshold number, the wireless remote control lighting unit enters an address setting mode to set an address of the wireless remote control lighting unit.

2. The wireless remote control lighting unit of claim 1, further comprising a capacitor coupled to the power on detection circuit, the capacitor supplying power to the power on detection circuit when the power source is powered off during the predetermined period.

3. The wireless remote control lighting unit of claim 1, further comprising a receiver circuit configured to receive a remote control signal, wherein the remote control signal includes an address signal for setting the address of the wireless remote control lighting unit.

4. The wireless remote control lighting unit of claim 3, wherein the wireless remote control lighting unit compares the address signal with its current address to determine whether or not to set the address of the wireless remote control lighting unit according to the address signal.

5. The wireless remote control lighting unit of claim 1, wherein the power on detection circuit detects and counts the power on times of the power source during the predetermined period in a manner selected from one or a combination of two or more of the followings: counting total power on times of the power source during a preset period, counting power on times of the power source when an interval between two successive power on times meets a predetermined requirement, counting power on times of the power source when an interval between two successive power off times meets a predetermined requirement, counting total power off times of the power source during a preset period, counting power off times of the power source when an interval between two successive power on times meets a predetermined requirement, or counting power off times of the power source when an interval between two successive power off times meets a predetermined requirement.

6. A wireless remote control lighting system, comprising:

a remote controller transmitting a remote control signal, wherein the remote control signal contains an address signal;

a wireless remote control lighting unit which receives power from a power source and receives the remote control signal, the wireless remote control lighting unit including a power on detection circuit which detects and counts power on times of the power source during a predetermined period, wherein when the power on times reach a threshold number, the wireless remote control lighting unit enters an address setting mode to set an address of the wireless remote control lighting unit.

7. The wireless remote control lighting system of claim 6, wherein the wireless remote control lighting unit further includes a capacitor coupled to the power on detection circuit, the capacitor supplying power to the power on detection circuit when the power source is powered off during the predetermined period.

8. The wireless remote control lighting system of claim 6, wherein the wireless remote control lighting unit compares the address signal with its current address to determine whether or not to set the address of the wireless remote control lighting unit according to the address signal.

9. The wireless remote control lighting system of claim 6, wherein the power on detection circuit detects and counts the power on times of the power source during the predetermined period in a manner selected from one or a combination of two or more of the followings: counting total power on times of the power source during a preset period, counting power on times of the power source when an interval between two successive power on times meets a predetermined requirement, counting power on times of the power source when an interval between two successive power off times meets a predetermined requirement, counting total power off times of the power source during a preset period, counting power off times of the power source when an interval between two successive power on times meets a predetermined requirement, or counting power off times of the power source when an interval between two successive power off times meets a predetermined requirement.

10. A control method for a wireless remote control lighting unit, the wireless remote control lighting unit receiving power from a power source, the method comprising:

detecting and counting power on times of the power source during a predetermined period;

entering an address setting mode for setting an address of the wireless remote control lighting unit when the power on times reach a threshold number;

receiving a remote control signal, wherein the remote control signal includes an address signal; and setting the address of the wireless remote control lighting unit according to the address signal.

11. The control method for a wireless remote control lighting unit of claim 10, wherein the step of setting the address of the wireless remote control lighting unit according to the address signal comprises:

comparing the address signal with a current address of the wireless remote control lighting unit in the address setting mode;

keeping the current address of the wireless remote control lighting unit when the address signal is the same as the current address; and setting the address of the wireless remote control lighting unit according to the address signal when the address signal is not the same as the current address.

12. The control method for a wireless remote control lighting unit of claim 10, further comprising:

leaving the address setting mode when address setting is not completed within an address setting period.

13. The control method for a wireless remote control lighting unit of claim 10, wherein the step of detecting and counting the power on times of the power source during the predetermined period includes one or a combination of two or more of the followings: counting total power on times of the power source during a preset period, counting power on times of the power source when an interval between two successive power on times meets a predetermined requirement, counting power on times of the power source when an interval between two successive power off times meets a predetermined requirement, counting total power off times of the power source during a preset period, counting power off times of the power source when an interval between two successive power on times meets a predetermined requirement, or counting power off times of the power source when an interval between two successive power off times meets a predetermined requirement.

14. The control method for a wireless remote control lighting unit of claim 10, further comprising:

dividing a plurality of wireless remote control lighting units into several groups, wherein each of the groups includes at least one wireless remote control lighting unit; and providing each of the groups with a switch, wherein one of the groups receives the power from the power source through the corresponding switch.

* * * * *